(12) United States Patent
Yim

(10) Patent No.: US 8,306,915 B2
(45) Date of Patent: Nov. 6, 2012

(54) METHOD AND SYSTEM FOR AUTHENTICATING SOFTWARE LICENSE

(75) Inventor: Byung-woong Yim, Seoul (KR)

(73) Assignee: Mtekvision Co., Ltd., Seoul (KR)

( * ) Notice: Subject to any disclaimer, the term of this patent is extended or adjusted under 35 U.S.C. 154(b) by 1232 days.

(21) Appl. No.: 11/722,902

(22) PCT Filed: Dec. 7, 2005

(86) PCT No.: PCT/KR2005/004175
§ 371 (c)(1),
(2), (4) Date: Mar. 11, 2008

(87) PCT Pub. No.: WO2006/071007
PCT Pub. Date: Jul. 6, 2006

(65) Prior Publication Data
US 2012/0041878 A1    Feb. 16, 2012

(30) Foreign Application Priority Data
Dec. 27, 2004    (KR) .................. 10-2004-0112764

(51) Int. Cl.
*G06Q 40/00*    (2012.01)
(52) U.S. Cl. ............... 705/44; 726/4; 726/28; 726/7; 726/3; 705/67; 705/16; 705/2; 705/39; 235/382.5

(58) Field of Classification Search .............. 705/2, 16, 705/39, 44, 67; 726/3, 4, 7, 28; 235/382.5
See application file for complete search history.

(56) References Cited

FOREIGN PATENT DOCUMENTS
| | | |
|---|---|---|
| JP | 08-7009 A | 1/1996 |
| KR | 1998-30143 A | 7/1998 |
| WO | WO 99-44114 A | 9/1999 |

*Primary Examiner* — Daniel Felten
(74) *Attorney, Agent, or Firm* — Birch, Stewart, Kolasch & Birch, LLP

(57) ABSTRACT

The present invention is directed to a method and system for authenticating software license. The method for authenticating software license according to an embodiment of the present invention transmits a usage authorization request to an authentication information management server through a communication network, and receives and stores authentication information from the authentication information management server. Subsequently, the method for authenticating software license according to an embodiment of the present invention transmits a terminal identifier to a personal computer, and calculates run-time of software using a launch signal, a termination signal, or combinations thereof, received from the personal computer, corresponding to the running of software, and charges in accordance with the calculated run-time of software. The present invention enables users to authenticate software license using a mobile communication terminal.

14 Claims, 5 Drawing Sheets

METHOD AND SYSTEM FOR AUTHENTICATING SOFTWARE LICENSE

CROSS REFERENCE TO RELATED APPLICATIONS

This application is a U.S. National Application of International Application PCT Application No. PCT/KR2005/004175 filed on Dec. 7, 2005, which claims the benefit of priority from Korean Patent Application No. 10-2004-0112764 filed on Dec. 27, 2004. The disclosures of International Application PCT Application No. PCT/KR2005/004175 and Korean Patent Application No. 10-2004-0112764 are incorporated herein by reference.

TECHNICAL FIELD

The present invention is directed to a method and system for authenticating software license, more specifically to a method and system for authenticating software capable of preventing illegal copying of software and leading legal use of software.

BACKGROUND ART

In general, a user purchases and uses software which is used in personal computer systems. A reasonable price is set for software as an outcome of the developer's time and effort.

Recently, however, a rapidly increasing number of users are installing and using software on their computer after purchasing only one software program, are copying software illegally after obtaining software through an illegal route, or are downloading software from the Internet. It demoralizes developer's will for development of software, obstructing the development of software.

In using software, although a purpose of using the software is to use it temporarily or for testing only, a user who tries to use the software legally has to pay for the entire software.

Recently, in order to solve aforementioned problem, web sites offering a rental service has become available for users who try to use specific software temporarily. However, users must always run software on-line to use the software even temporarily, and this causes inconvenience in using the software and is slow in case of increased access traffic. Moreover, there is a problem that the fee for using the software must be paid in advance and for a fixed period (e.g., one month, one year, etc.) regardless of the period of using the software.

DISCLOSURE

Technical Problem

In order to solve aforementioned problems, the present invention aims to provide a method and system for authenticating software license that enable users to authenticate software license by using mobile communication terminals and legally use software which is installed on their personal computers by using authenticated mobile communication terminals.

Another objective of this invention is to provide a method and system for authenticating software license that enable users to use software at inexpensive costs owing to paying the costs for only the period of using the installed software on their personal computers.

Another objective of the present invention is to provide a method and system for authenticating software license that bring a mobility for use of software, even installed on another computer, by connecting with an authenticated mobile communication terminal.

Another objective of the present invention is to provide a method and system for authenticating software license that can foster the volition of developers for software development owing to receiving reasonable prices for software.

Technical Solution

In order to achieve aforementioned problems, an aspect of the present invention provides a method for authenticating software license, executable by a mobile communication terminal, to control running of software installed on a personal computer. The method transmits usage authorization requests comprising selection information of software and a pre-stored terminal identifier from an authentication information management server connected through a communication network. The method also receives and stores authentication information from the authentication information management server generating rights information. Here, the rights information comprises connection information of a software identifier corresponding to the terminal identifier and the selection information of software. If a request for terminal identifier is received from the personal computer connected through a data cable or a wireless local area communication network, the terminal identifier is transmitted to a personal computer. The run time of software is calculated, using any of the signals from a group consisting of a launch signal and a termination signal for running software, or combinations thereof, received in accordance with running of the software in the personal computer. The method also executes charging according to the calculated run-time of software. If a command to run software is received from a user, the personal computer transmits a request for response to identify the rights, comprising the terminal identifier and software identifier of the software commanded to be run to the authentication information management server through a communication network, and if a response to identify the rights is received from the authentication information management server through a communication network, the personal computer launches running of said software commanded to be run, and transmits the launch signal and the termination signal to the mobile communication terminal in accordance with whether the software is run.

Transmission of the request for response to identify the rights and receiving of the response to identify the rights by the personal computer can be carried out via the mobile communication terminal.

If the usage authorization request further comprises selection information of period of use of software corresponding to the software selection information, and the authentication information comprises a period of use corresponding to the selection information of period of use, the steps of charging can (a) deduct the calculated run-time of software from the period of use and (b) determine whether the period of time is completely used up. The step (a) and step (b) can be repeatedly carried out until the termination signal is received from the personal computer, if the period of use is not completely used up. A termination request can be transmitted to the personal computer, if the period of use is completely used up. The personal computer forces the software to shut down in accordance with the termination request.

If the usage authorization request further comprises pre-payment usage-fee information for using software corresponding to the software selection information, and the authentication information comprises usage-fee calculation standard information, the steps of charging can (a) calculate a usage-fee using the run-time of software and the usage-fee calculation standard information and (b) determine whether a balance corresponding to the prepaid usage-fee information is completely used up. The step (a) and step (b) can be repeatedly carried out until the termination signal for running software is received from the personal computer, if said balance is not completely used up. A termination request can be transmitted to the personal computer, if the balance is completely used up. The personal computer forces the software to shut down in accordance with the termination request.

If the usage authorization request further comprises a unified payment request of usage-fee in a phone bill for using software corresponding to the software selection information, and the authentication information comprises usage-fee calculation standard information, the steps of calculating the run-time of software can determine whether the termination signal is received, after receiving the launch signal, and calculate the run-time of software using the difference between receiving the launch signal and receiving the termination signal, if the termination signal for running software is received. The step of charging calculates usage-fee information using the run-time of software and the usage-fee calculation standard information, and transmits a request for charging comprising the calculated usage-fee to a mobile communication service system.

Another aspect of this invention provides a mobile communication terminal executing a function of authenticating software license for controlling whether to run software installed on a personal computer. In the terminal, a communication unit transmits a usage authorization request comprising selection information of software and a pre-stored terminal identifier to an authentication information management server connected via a communication network and receives authentication information from the authentication information management server generating rights information. The rights information comprises terminal identifier corresponding to the terminal identifier and the selection information of software. A storing unit stores the terminal identifier and the received authentication information. An interface unit allows a mobile communication terminal to be connected to the personal computer via a data cable or wireless local area communication network, to receive a request for terminal identifier from the personal computer, to transmit the terminal identifier to the personal computer, and to receive at least one signal of a group consisting of a launch signal for running software and a termination signal corresponding to running software from the personal computer. A timer-unit calculates run-time of software using any of the received time information of the launch signal and termination signal. A charging unit charges in accordance with the calculated run-time of software. The personal computer transmits a request for response to identify the rights comprising the terminal identifier and a software identifier of the software commanded to run to the authentication information management server via a communication network if a command to run software is inputted by a user, and the personal computer launches running the software commanded to run if a response to identify the rights is received from the authentication information management server via a communication network, and the personal computer transmits the launch signal or the termination signal corresponding to whether the software is run.

If the usage authorization request further comprises selection information of period of software use corresponding to the software selection information, and the authentication information comprises a period of use corresponding to the selection information of period of use, the step of charging can deduct the calculated run-time of software from the period of use and determine whether the period of time is completely used up. If the period of use is not completely used up, the deduction is repeated until the termination signal is received from the personal computer. If the period of use is completely used up, a termination request is transmitted to the personal computer, and the personal computer shuts down the software in accordance with the termination request.

If the usage authorization request further comprises prepaid usage-fee information for using software corresponding to the software selection information, and the authentication information comprises usage-fee calculation standard information, the step of charging can calculate a usage-fee using the run-time of software and the usage-fee calculation standard information and determine whether a balance corresponding to the prepaid usage-fee information is completely used up. If the balance is not completely used up, the deduction is repeated until the termination signal is received from the personal computer. If the balance is completely used up, a termination request is transmitted to the personal computer. The personal computer shuts down the software in accordance with the termination request.

If the usage authorization request further comprises a request to include usage fee in a phone bill, for using software corresponding to the software selection information, and the authentication information comprises usage-fee calculation standard information, the step of calculating run-time of software can determine whether the termination signal for running software is received, after the launch signal is received, and calculates run-time of software using the difference in time between receiving the launch signal and receiving the termination signal, if the termination signal is received. The step of charging calculates usage-fee information using the run-time of software and the usage-fee calculation standard information, and transmits a request for charging comprising the calculated usage-fee to a mobile communication service system.

DESCRIPTION OF DRAWINGS

These and other features, aspects, and advantages of the present invention will become better understood with regard to the following description, appended claims, and accompanying drawings where:

Figure 1:
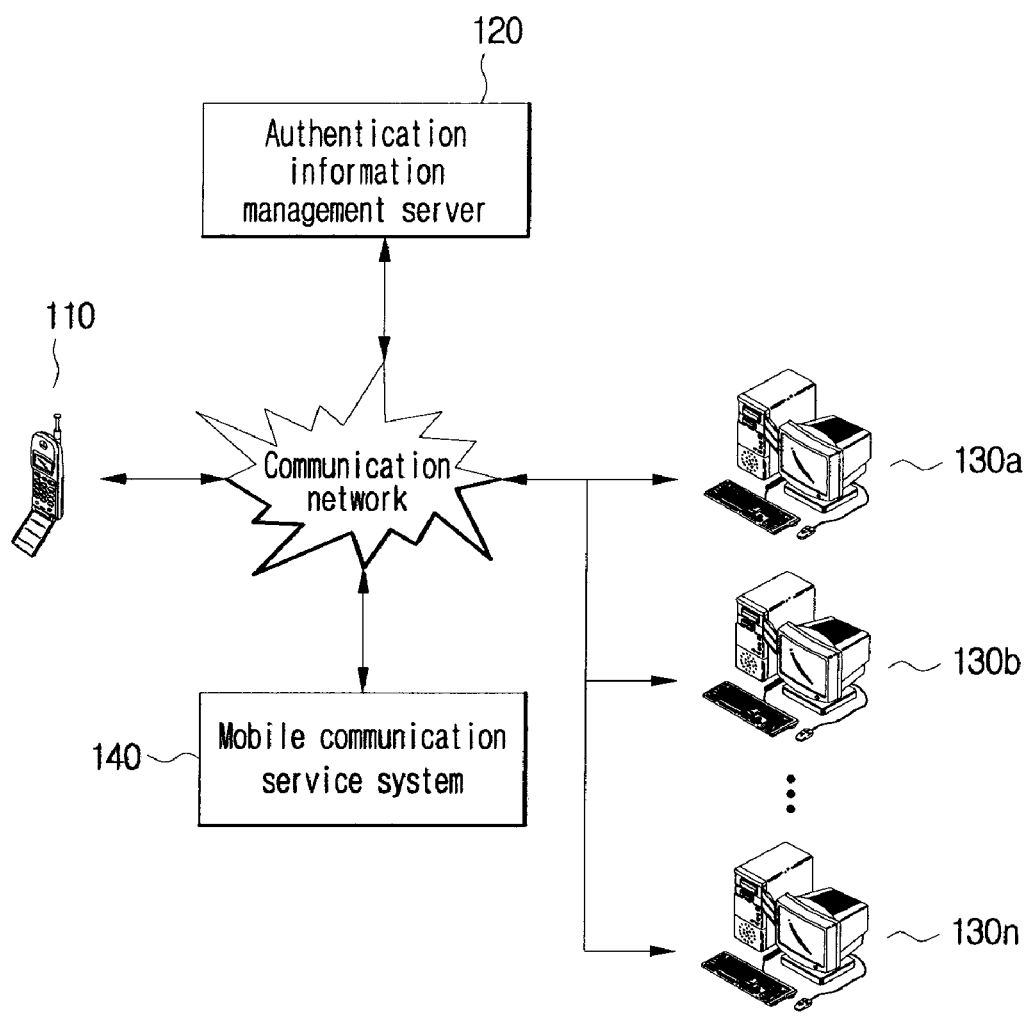
FIG. 1 shows an overall system structure for executing a method for authenticating software license, based on a preferred embodiment of the present invention.

110: Mobile communication terminal
120: Authentication information management server
130: Personal computer
140: Mobile communication service system
210: Terminal communication unit
215: Authentication executing unit
220: Terminal storing unit
225: Computer connecting unit 230: Timer unit
235: Fee calculating unit
240: Terminal controlling unit
310: Server communication unit
315: Server storing unit
320: Software managing unit
325: Authentication information managing unit
330: Server controlling unit Mode for Invention As used in this application, the term "unit" is intended to refer to a self-contained component of a system, either hardware, a combination of hardware and software, software, or software in execution. For example, a unit can be, but is not limited to being, a process running on a processor, a processor, an electronic circuit executing a process, multiple storage drives (of optical and/or magnetic storage medium), an object, an executable, a thread of execution, a program, and/or a computer. One or more units can reside within an electronic circuit, a process and/or thread of execution.

The present invention, operative advantages of the present invention, and objectives achieved by embodying the present invention shall be apparent with reference to the accompanying drawings and the description therein.

Hereinafter, preferred embodiments of the present invention shall be described in detail with reference to the accompanying drawings. To aid overall understanding of the present invention, the same reference numbers shall be assigned to the same means, regardless of the figure number.

Figure 2:
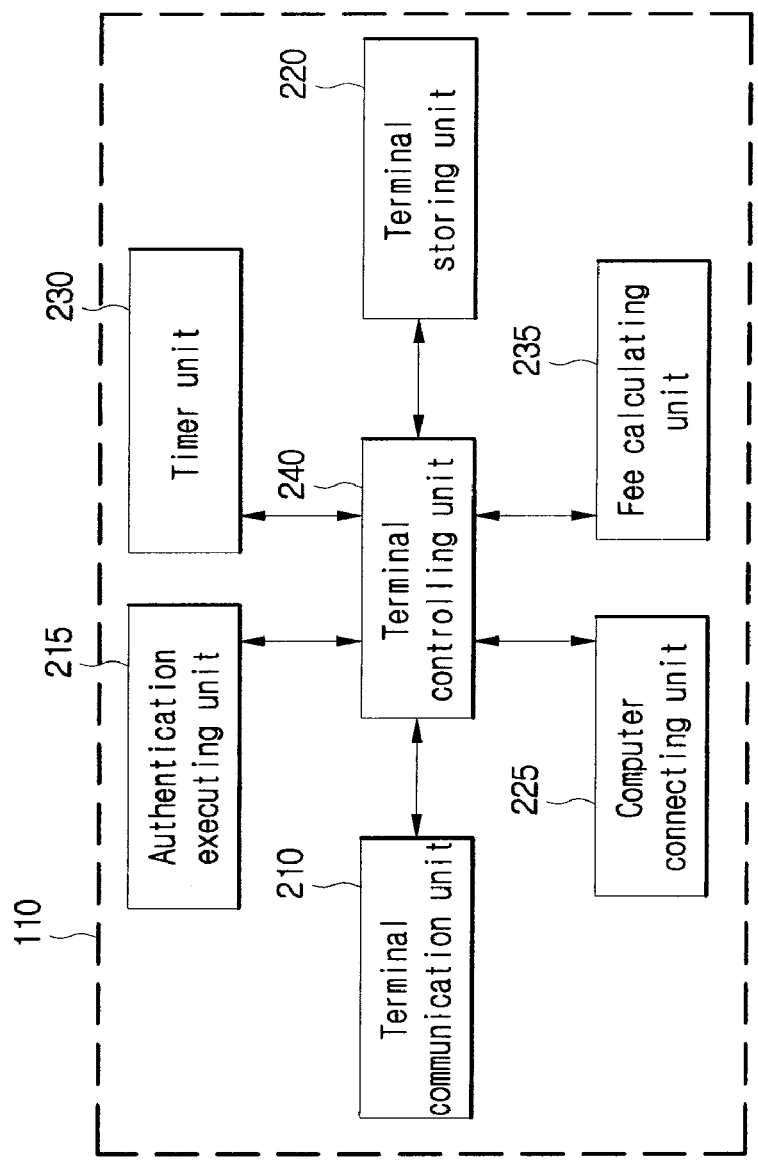
FIG. 2 shows a block diagram of the structure of a mobile communication terminal based on a preferred embodiment of the present invention.
Figure 3:
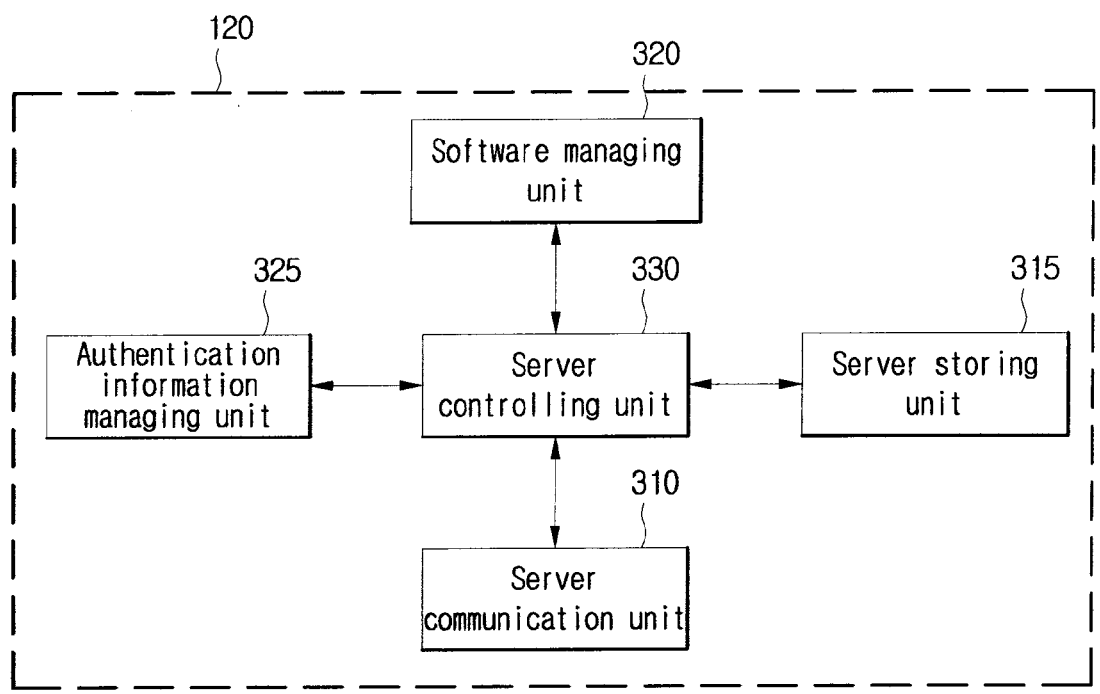
FIG. 3 shows a block diagram of the structure of an authentication information management server based on a preferred embodiment of the present invention.

FIG. 1 is an overall system structure for executing a method for authenticating software license, based on a preferred embodiment of the present invention. FIG. 2 is a block diagram of the structure of a mobile communication terminal based on a preferred embodiment of the present invention. FIG. 3 is a block diagram of the structure of an authentication information management server based on a preferred embodiment of the present invention.

Referring to FIG. 1, the system for executing a method for authenticating software license comprises a mobile communication terminal 110, an authentication information management server 120, one or more personal computers 130a, 130b, . . . , 130n (hereinafter referred to as 130), and a mobile communication service system 140.

As shown in FIG. 2, a mobile communication terminal 110 can comprise a terminal communication unit 210, an authentication executing unit 215, a terminal storing unit 220, a computer connecting unit 225, a timer unit 230, a fee calculating unit 235, and a terminal controlling unit 240.

The terminal communication unit 210 transmits software selection information and usage authorization request for software to the authentication information management server 120 through a communication network, and receives authentication information from the authentication information management server 120. The usage authorization request can comprise information for setting payment condition (e.g., prepaid subscriber, deferred payment subscriber), information for selecting a period of use (e.g., when the user wants to use an arbitrary software for a limited time), payment means information (e.g., credit card, paid with phone bill). The authentication information can comprise a software identifier, information for setting a period of using software (e.g., calculation standards of usage-fee corresponding to time of using software), information for prepayment of usage-fee (e.g., prepaid usage-fee for using a software program until a certain amount of money is reached). The terminal communication unit 210 can transmit a request for charging the usage-fee, which is calculated by the fee calculating unit 235 controlled by the terminal controlling unit 240, to the mobile communication service system 140, if the payment means information, designated by the user, is set as payment with phone bill.

The authentication executing unit 215 transmits a terminal identifier, extracted from the terminal storing unit 220, through the computer connecting unit 225 by a terminal identifier request received from a personal computer 130 by a software management program installed on a personal computer 130 or action of software executed by a request of user, if the mobile communication unit 110 and the personal computer 130 are connected by the computer connecting unit 225. If a request for response to identify the right is received from the personal computer 130 by a software management program or action of software requesting execution, it transmits a request for response to identify the right to the authentication information management server 120 through the terminal communication unit 210, and it transmits the received response to identify the right to the personal computer 130.

The terminal storing unit 220 stores an operating system of the mobile communication terminal 110, a terminal identifier (e.g., a phone number, IMSI (International Mobile Subscriber Identity), etc.), authentication information (e.g., a software identifier, information for setting the period of using software, fee standard information, etc.), prepaid usage-fee information, information on maximum amount of money for usage, duration of software usage counted by the timer unit 230, and usage-fee information calculated by the fee calculating unit 235.

The computer connecting unit 225 is interface means connecting mobile communication terminals with the personal computer 130, and is connection means, for example communication means connecting mobile communication terminals with the personal computer 130 through local area wireless communication networks, such as Bluetooth, IrDA, Zigbee, etc., connecting the mobile communication terminals with the personal computer 130.

The timer unit 230 is counting means that counts the run-time of software, when users input an execution order of software (e.g., selection of winword.exe file or corresponding shortcut) installed on personal computer 130 by input means such as a keyboard.

The Fee calculating unit 235 generates information of usage-fee by using the time information counted by the timer unit 230 and the fee standard information (i.e., in case a plurality of fee standard information is in the terminal storing unit 220, the fee standard information corresponding to the software identifier runs by the user's personal computer 130) stored by the terminal storing unit 220. When the period of use expires or the money is completely used up according to prepayment usage-fee information, as the user is a prepaid subscriber prepaying usage-fee in the amount of money or a period subscriber setting a period of use, and prepaid utilization-fee information exists in the terminal storing unit 220, the fee calculating unit 235 can transmit the termination request for software to the software management program installed on the personal computer 130 or execution request software. Also, when a user executes setting limit of usable money using a key input unit (not illustrated), and the information for limit of usable money is stored in the terminal storing unit 220, the fee calculating unit 235 can transmit the termination request for software to the software management program or execution request software if an accumulated usage-fee correspond to information for limit of usable money, similar to the method applied to the prepaid subscriber, described earlier.

The fee calculating unit 235 can transmit a charging request corresponding to usage-fee information to the mobile communication service system 140 through terminal communication unit 210, if payment means is designated by the user to be included in the phone bill. A user can have usage-fee information, which is stored in the terminal storing unit 220, display as an accumulated form in units of regular period in the display unit (not illustrated).

The terminal controlling unit 240 controls the terminal communication unit 210, the authentication executing unit 215, the terminal storing unit 220, the computer connecting unit 225, the timer unit 230, and the fee calculating unit 235 for software, installed on the personal computer 130, to be authenticated and executable by the mobile communication terminal 110 based on the subject invention.

It is not necessary that all components of mobile communication unit 110 shown in FIG. 2 are realized as a hardware form, and some components (e.g., authentication executing unit 215, timer unit 230, and fee calculating unit 235) can be realized as a form of application program. Any mobile communication terminal 110 that has a communication function and can execute aforementioned functions is applicable. For example, the mobile communication terminal 110 can be any of a group consisting of a cellular phone and a PDA (Personal Digital Assistant).

As shown in FIG. 3, the authentication information management server 120 can comprise the server communication unit 310, the server storing unit 315, the software managing unit 320, the authentication information managing unit 325, and the server controlling unit 330.

The server communication unit 310 transmits a program managing software received from the personal computer 130 or setup program of the software, stored in server storing unit 315, corresponding to a request for download of software to the personal computer 130 through communication networks. Also, the server communication unit 310 receives software selection information desired for use, usage authorization request for software from the mobile communication terminal 110, and transmits the authentication information generated from the authentication information managing unit 325 and stored in the server storing unit 315 to the mobile communication unit 110 through communication networks. Also, if a request for response to identify the rights is received from the mobile communication terminal 110 or the personal computer 130, the server communication unit 310 transmits the response to identify the rights corresponding to the rights information (e.g., a terminal identifier, a software identifier corresponding to a terminal identifier, information for setting the period of using software, fee information, prepaid usage-fee information, etc.) generated from the authentication information management unit 325 and stored in the server storing unit 315 to the mobile communication terminal or the personal computer 130.

The server storing unit 315 stores the operating program, authentication information, rights information, software management program of the authentication information management server 120, or a setup program corresponding to one of the software.

The software managing unit 320 extracts a list of software capable of being installing and transmits the list to the personal computer 130 connected through communication networks. If a request for download is received through the server communication unit 310, the software managing unit 320 extracts a corresponding setup program from the server storing unit 315 and transmits to the personal computer 130 through the server communication unit 310.

The authentication information managing unit 325 generates authentication information and/or rights information and stores them in the server storing unit 315, if software selection information desired for use and usage authorization request for software are received from the mobile communication terminal 110. The authentication information managing unit 325 generates a response to identify the rights corresponding to the rights information (e.g., a terminal identifier, a software identifier corresponding to a terminal identifier, information for setting the period of using software, fee information, prepaid usage-fee information, etc.) stored in the server storing unit 315 and transmits to the mobile communication terminal or the personal computer 130 through the server communication unit 310, if a request for response to identify the rights is received from the mobile communication terminal 110 or the personal computer 130. The authentication information can identical to the rights information.

The server controlling unit 330 controls the server communication unit 310, the server storing unit 315, the software managing unit 320, and the authentication information managing unit 325 to ensure that the software installed in installed on the personal computer 130 runs only if the software connects with the mobile communication terminal 110 and authenticated properly.

It is not necessary that all components of the authentication information management server shown in FIG. 3 are realized as a hardware form, and some components (e.g., the software managing unit 320, the authentication information managing unit 325) may be realized as a form of application program. Some components of the authentication information management server 120 may be realized as an independent device. For example, the authentication information management server 120 comprising the authentication information managing unit 325 may execute the authentication information management function only, and the software managing unit 320, which is realized with an independent device, may execute a function of distribution of software program only.

The personal computer 130 shown in FIG. 1 is a general computer (e.g., desktop computer, notebook computer, etc.) on which the software management program and software program based on the subject invention are installed. The software management program and software program may be downloaded from the authentication information management server 120 or installed from a recording medium, for example, a CD-ROM disk. The soft management program can execute the display function of software list (i.e., a function that display to a user a list of programs executable by an authentication process based on the invention on the screen of personal computer 130) and the authentication function (i.e., a function that determines whether the software selected by a user should be executed, using the terminal identifier received from the connected mobile communication terminal 110). The software is an operation tool which is executed when authentication is executed successfully using a terminal identifier, and can comprise all paid software programs (e.g., word processor programs, spreadsheet programs, spam-blocking programs, translation programs, CAD programs). Of course, if each software program has an algorithm capable of carrying out the authentication function of the software management program, the software management program can be omitted. The software management program or the authentication function included in software will be described later in detail with reference to a relative drawing.

The mobile communication service system 140 shown in FIG. 1 carries out a function of connecting the mobile communication terminal 110 to the authentication information management server 120 through communication networks, and if a request for sum-charging to sum up usage-fee of software and communication fee is received from the mobile communication terminal 110, the usage-fee of software is summed up and charged in a similar manner to the method of charging usage-fee for wireless interne contents.

Figure 4:
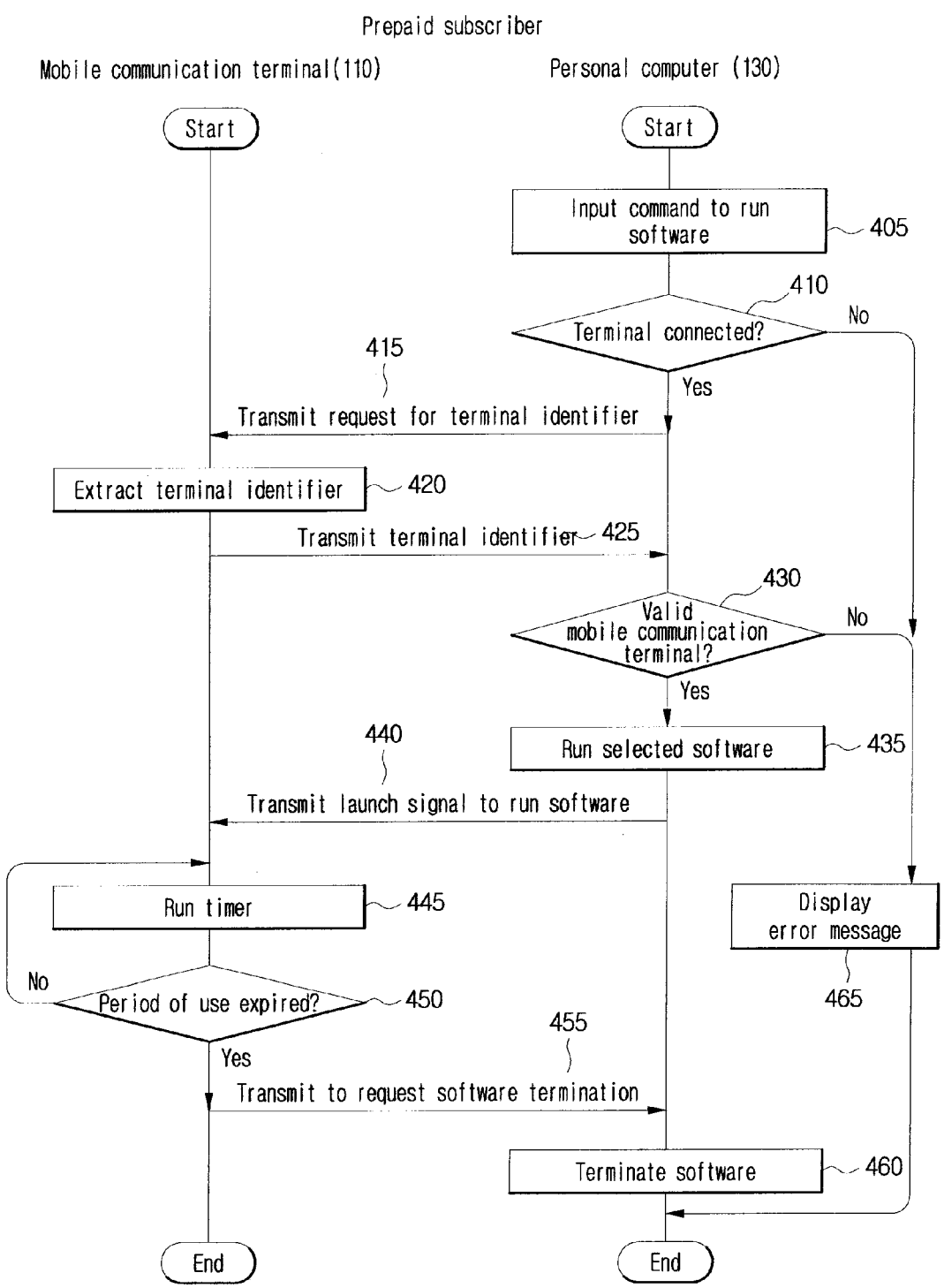
FIG. 4 shows a flowchart of a method for controlling a prepaid subscriber to use software, based on a preferred embodiment of the present invention.

FIG. 4 is a flowchart of a method for controlling the use of software by a prepaid subscriber, based on a preferred embodiment of this invention.

Illustrated in FIG. 4 is a process in which a prepaid subscriber, who has received authentication information from the authentication information management server 120, uses the software installed on a personal computer 130, using the mobile communication terminal 110. Although not illustrated in FIG. 4, the process of the mobile communication terminal 110 storing the authentication information is as follows: Using the communication function of the mobile communication terminal 110, the prepaid subscriber connects to the authentication information management server 120, and transmits the terminal identifier (e.g., telephone number, IMSI) and software selection information desired for use, usage authorization request for software (e.g., prepaid subscriber selection, selection information of period of use, payment means information). After setting and storing the terminal identifier to correspond to the software identifier in accordance with the software selection information desired for use, the authentication information management server 120 transmits the authentication information (e.g., software identifier, information for setting a period of using software) to the mobile communication terminal 110. The mobile communication terminal 110 stores the received authentication information in the terminal storing unit 220.

Referring to FIG. 4, in step 405, the personal computer 130 receives execution command of software for authentication prior to execution from a user through input means, for example, the keyboard. In case the user tries to use the software in connecting the mobile communication terminal 110 to the personal computer 130, the software must have been previously installed on the personal computer 130.

In step 410, the personal computer 130 determines whether the mobile communication terminal 110 is connected. The mobile communication terminal 110 can be connected with the personal computer 130 through a USB data cable or a local area wireless communication networks. The steps after step 410 can be carried out in the software management program or the software itself.

If the personal computer 130 is not connected with the mobile communication terminal 110, a predetermined error message (e.g., "Please connect to the mobile communication terminal") is displayed in the screen in step 465.

If the personal computer 130 is connected to the mobile communication terminal 110, however, the personal computer 130 transmits a request for a terminal identifier to the mobile communication terminal 110 in step 415.

In step 420, the mobile communication terminal 110 extracts the terminal identifier stored in the terminal storing unit 220, and transmits the extracted terminal identifier to the personal computer 130 in step 425.

In step 430, the personal computer 130 determines whether the terminal identifier received from the mobile communication terminal 110 has rights to run the software. Some of the methods by the personal computer 130 for determining whether the terminal identifier has the rights to run the software are as follow: The first method is recognizing the mobile communication terminal to be valid if information for response to identify the rights (i.e., information showing that the terminal identifier is stored to correspond to the software identifier) is received from the authentication information management server 120 after the personal computer 130 transmits the request for response to identify the rights comprising the terminal identifier to the authentication information management server 120 through communication networks. In the second method, the personal computer 130 recognizes the mobile communication terminal 110 to be valid if the personal computer 130 transmits the request for response to identify the rights comprising the terminal identifier to the mobile communication terminal 110, and the mobile communication terminal 110 transmits the received request for response to identify the rights to the authentication information management server 120, receives information for response to identify the rights from the authentication information management server 120, and transmits to the personal computer 130. The third is a method in which, after determining whether the personal computer is connected to a communication network, the personal computer receives response to identify the rights using the first method if connected, and receives response to identify the rights using the second method if not connected. It should be apparent that there is no restriction to the method as long as the personal computer can determine whether the mobile communication terminal 110 is valid.

If the mobile communication terminal 110 is recognized to be invalid, a predetermined error message (e.g., "This is not a valid mobile communication terminal") is displayed on the screen in step 465.

However, if the mobile communication terminal 110 is recognized to be valid, the selected software is run in step 435.

In the following step 440, the personal computer 130 transmits a launch signal to run the software to the mobile communication terminal 110. A launch signal to run the software can comprise a software identifier to carry out charging properly in the mobile communication terminal 110. It should be apparent that the order of step 435 and step 440 can be inverted.

In step 445, the mobile communication terminal 110 counts the time that the user runs and uses the software. The recognized time that the software is run is a time range between receiving a launch signal to run software and a termination signal. Therefore, although not illustrated, a step by which the mobile communication terminal 110 determines whether the termination signal to run software is received from the personal computer 130 can precede or follow step 445. The termination signal can comprise a software identifier for the purpose of charging properly in the mobile communication terminal 110. Although not illustrated in FIG. 4, the mobile communication terminal 110 can recognize the user to be not legal and transmit a request for terminating the software to the personal computer, if the charging standard information corresponding to the software identifier, included in the received launch or termination signal, is not stored in the terminal storing unit. When the period or money, designated by the user, for using the software is exceeded, the charging standard information, initially requested by the user, can be deleted automatically to prevent the user from illegally using the software.

In step 450, the mobile communication terminal 110 determines whether the period of use corresponding to information for setting a period of use, set by the user to run the software, is expired.

If the predetermined period of use is not expired, and the termination signal is not received, step 445 is repeated. If the predetermined period of use is expired, however, the mobile communication terminal 110 transmits a request for terminating software to the personal computer 130 in step 455.

In step 460, the personal computer 130 terminates the currently software. If the user does not set a new period of use, the user can no longer run the software.

In FIG. 4, a user who has pre-set a period of use for software has been described, but for a prepaid subscriber prepaying an amount of money or a user previously setting information for limit of usable money, determining whether to run the software can be controlled by determining whether the prepaid money or the set limit of usable money is used excessively, because the fee calculating unit 235 using the time information calculated by the timer unit 230 and the fee standard information can calculate usage-fee in real-time.

Figure 5:
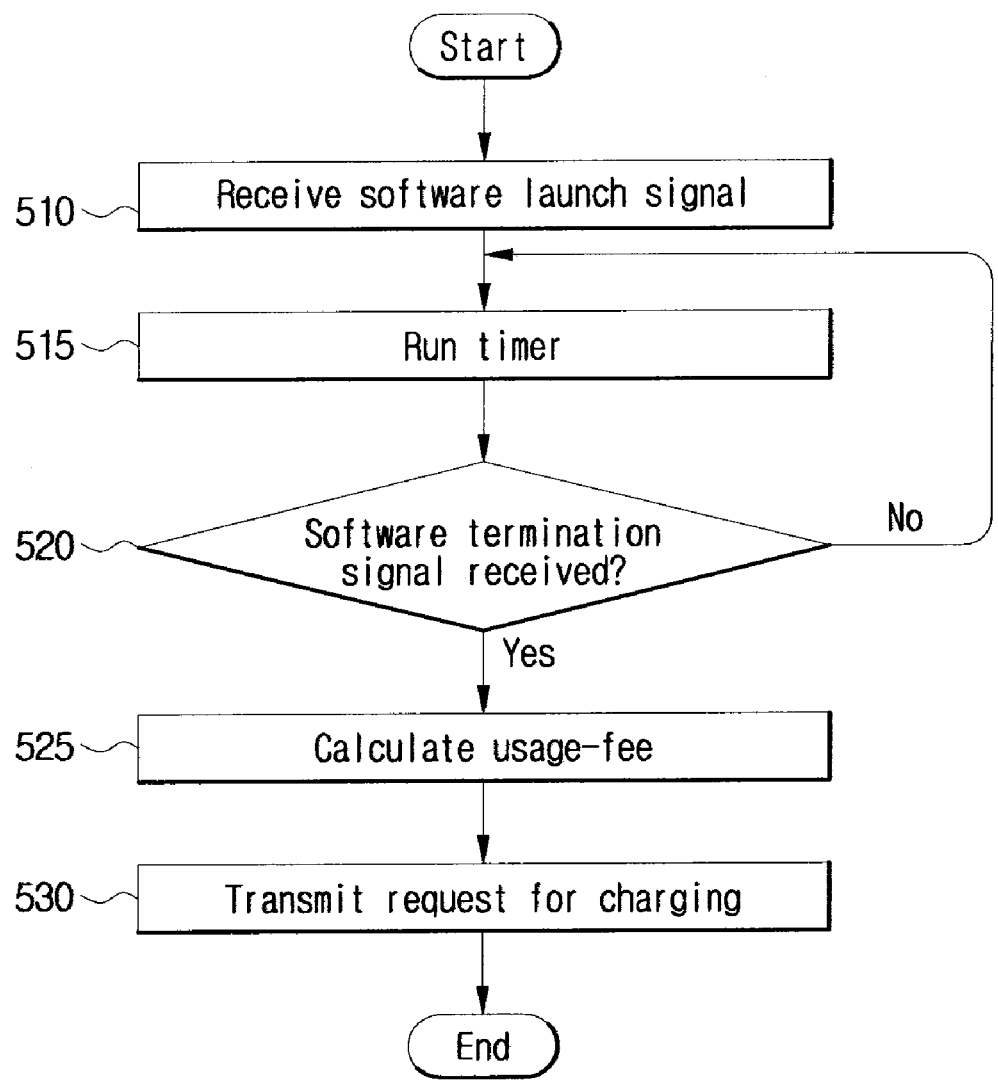
FIG. 5 shows a flowchart of a method for charging usage-fee for using software, based on another preferred embodiment of the present invention.

FIG. 5 is a flowchart of a method for charging usage-fee for using software, based on another embodiment of the present invention.

FIG. 5 shows the steps after running one of the software installed on the personal computer 130, but it should be apparent that the steps before running the software can be identical to the described steps with reference to FIG. 4

Referring to FIG. 5, the mobile communication terminal 110 receives a launch signal to run software from the personal computer 130 (which can be a software management program or the software itself) in step 510. A launch signal to run software can comprise a software identifier.

The mobile communication terminal 110 counts time of using software after the user runs the software in step 515. The time recognized as running the software is a range of time from receiving a launch signal to run software to receiving a termination signal from the personal computer.

In step 520, the mobile communication terminal 110 determines whether a termination signal is received from the personal computer 130. A termination signal is transmitted to the mobile communication terminal 110 when the software is stopped running in the personal computer 130, and can comprise a software identifier.

If the termination signal is not received, step 515 is carried out because the user still using the software.

However, if the termination signal is received, the mobile communication terminal 110 calculate usage-fee corresponding to the time of software usage using the time information counted by the timer unit 230 and the fee standard information received and stored from the authentication information management server 120.

Then in step 530, the mobile communication terminal 110 transmits a request for charging corresponding to the calculated usage-fee to the mobile communication service system 140. Of course, in case prepaid usage-fee information is stored in the mobile communication terminal 110 for a prepaid subscriber, step 530 can be omitted by deducting the usage-fee. Also, in case information for setting a period of using software is stored in the mobile communication terminal 110 for a prepaid subscriber, step 525 and step 530 can be omitted by deducting the time information counted in step 515.

As described above, the method and system for authenticating software license, based on the present invention, can be rightfully used by any personal computer 130, in which the software determining the running of software by use of an authentication function is installed, by connecting to a mobile communication terminal 110 since an individual mobile communication terminal 110 is used to have the software usage fee charged.

The accompanying drawings and detailed description are only an example of the present invention, serve only for describing the present invention, and by no means limit or restrict the spirit and scope of the present invention. Thus, any person of ordinary skill in the art shall understand that a large number of permutations and other embodiments are possible.

The true scope of the present invention must be defined only by the spirit of the appended claims

INDUSTRIAL APPLICABILITY

As described above, a method and system for authenticating software license based on this invention enable users to authenticate software license by using mobile communication terminals and legally use software which is installed on their personal computers by using authenticated mobile communication terminals.

Moreover, the present invention enables users to use software at inexpensive costs owing to paying the costs for only the period of using the installed software on their personal computers.

Furthermore, the present invention brings mobility to software because users can legally use the software, even installed on another computer, by connecting to an authenticated mobile communication terminal.

Furthermore, the present invention allows the software developer to receive legitimate price for their time and efforts, thereby fostering volition of software developers for developing useful software.

What is claimed is:

1. A method for authenticating a software license, executable by a mobile communication terminal, to control running of a software installed on a personal computer, the method comprising:
   transmitting authorization requests for use of at least one software to an authentication information management server, the authorization requests comprising selection information of the software installed on the personal computer and a pre-stored terminal identifier;
   receiving and storing authentication information based at least in part upon rights information from the authentication information management server, the rights information comprising connection information of a software identifier corresponding to the terminal identifier and the selection information of the software;
   receiving a request from the personal computer seeking use of the software;
   transmitting the terminal identifier to the personal computer in response to the request from the personal computer;
   calculating the running time of the software based upon running signal from the personal computer, the running signal including at least one of signal for launch of the software and signal for termination of the software; and
   charging a user's account according to the calculated running time of the software.

2. The method of claim 1, wherein if the authorization request for use of at least one software comprises selection information on a period of use of the software corresponding to the software selection information, and the authentication information comprises a period of use corresponding to the selection information of a period of use of the software, and wherein the steps of the charging comprise:
   (a) deducting the calculated running time of the software from the period of use;
   (b) determining whether the period of time is completely used up;
   carrying out the step (a) and the step (b) repeatedly until the termination signal is received from the personal computer, if the period of use is not completely used up; and
   transmitting a termination request to the personal computer, if the period of use is completely used up.

3. The method of claim 1, wherein if the authorization request for use of at least one software comprises prepayment usage-fee information for using the software corresponding to the software selection information, and the authentication information comprises usage-fee calculation standard information, the step of the charging comprises:
  (a) calculating a usage-fee using the running time of the software and the usage-fee calculation standard information;
  (b) determining whether a balance corresponding to the prepayment usage-fee information is completely used up;
  carrying out the step (a) and the step (b) repeatedly until the termination signal for running software is received from the personal computer, if the balance is not completely used up; and
  transmitting a termination request to the personal computer, if the balance is completely used up.

4. The method of claim 1, wherein if the authorization request for use of at least one software comprises a unified payment request of usage-fee in a phone bill for using software corresponding to the software selection information, and the authentication information comprises usage-fee calculation standard information, the step of calculating the running time of the software comprise:
  determining whether the termination signal for running the software is received, after receiving the launch signal; and
  calculating the running time of the software using a difference in time between receiving of the launch signal and receiving of the termination signal, if the termination signal for running the software is received;
  wherein the step of charging calculates usage-fee information using the running time of the software and the usage-fee calculation standard information, and transmits a request for charging comprising the calculated usage-fee to a mobile communication service system.

5. A mobile communication terminal executing a function of authenticating a software license for controlling whether to run a software installed on a personal computer, the mobile communication terminal comprising:
  a communication unit, the communication unit transmitting a usage authorization request to an authentication information management server, the usage authorization request comprising selection information of the software installed on the personal computer and a pre-stored terminal identifier, the communication unit receiving authentication information from the authentication information management server, the authentication information being based at least in part upon rights information, the rights information comprising connection information of a software identifier corresponding to the terminal identifier and the selection information of the software;
  a storing unit, the storing unit storing the terminal identifier and the received authentication information;
  an interface unit, the interface unit allowing a mobile communication terminal to be connected to a personal computer via communication network in order to receive a request for terminal identifier from the personal computer, to transmit the terminal identifier to the personal computer, and to receive running signal from the personal computer, the running signal including at least one of signal for launch of the software and signal for termination of the software;
  a timer-unit, the timer-unit calculating running time of the software using any of the received time information of the running signal; and
  a charging unit, the charging unit charging a user's account in accordance with the calculated running time of the software.

6. A storage medium tangibly embodying a machine-readable program of instructions executable by a mobile communication terminal to execute a method for authenticating a software license, executable by a mobile communication terminal, to control running of a software installed on a personal computer, the program readable by the mobile communication terminal, the storage medium including instructions for:
  transmitting authorization requests for use of at least one software to an authentication information management server, the authorization requests comprising selection information of the software installed on the personal computer and a pre-stored terminal identifier;
  receiving and storing authentication information based at least in part upon rights information from the authentication information management server, the rights information comprising connection information of a software identifier corresponding to the terminal identifier and the selection information of the software;
  receiving a request from the personal computer seeking use of the software;
  transmitting the terminal identifier to the personal computer in response to the request from the personal computer;
  calculating the running time of the software based upon running signal from the personal computer, the running signal including at least one of signal for launch of the software and signal for termination of the software; and
  charging a user's account according to the calculated running time of the software.

7. The storage medium of claim 6, wherein, if the authorization request for use of at least one software comprises selection information on a period of use of the software corresponding to the software selection information, and the authentication information comprises a period of use corresponding to the selection information of a period of use of the software, and wherein the step of charging comprises:
  (a) deducting the calculated running time of the software from the period of use;
  (b) determining whether the period of time is completely used up;
  repeating the step (a) and the step (b) until the termination signal is received from the personal computer if the period of use is not completely used up; and
  transmitting a termination request to the personal computer if the period of use is completely used up.

8. The storage medium of claim 6, wherein, if the authorization request for use of at least one software comprises prepaid usage-fee information for using the software corresponding to the software selection information, and the authentication information comprises usage-fee calculation standard information, the step of charging comprises:
  (a) calculating a usage-fee using the running time of the software and the usage-fee calculation standard information;
  (b) determining whether a balance corresponding to the prepayment usage-fee information is completely used up;
  repeating the step (a) and the step (b) until the termination signal is received from the personal computer if the balance is not completely used up; and transmitting a termination request to the personal computer if the balance is completely used up.

9. The storage medium of claim 6, wherein, if the authorization request for use of at least one software comprises a request to include usage fee in a phone bill, for using software corresponding to the software selection information, and the authentication information comprises usage-fee calculation standard information, the step of calculating running time of the software comprises:
   determining whether the termination signal for running the software is received, after receiving the launch signal is received; and
   calculating running time of the software using a difference in time between receiving of the launch signal and receiving of the termination signal, if the termination signal for running the software is received;
   wherein the step of charging calculates usage-fee information using the running time of the software and the usage-fee calculation standard information, and transmits a request for charging comprising the calculated usage-fee to a mobile communication service system.

10. The method of claim 1, wherein, if a request for running the software is received from a user, the personal computer transmits a request for identifying the rights to the authentication information management server, and the personal computer transmits the running signal to the mobile communication terminal according to the information on the rights generated by the authentication information management server.

11. The method of claim 10, wherein transmission of the request for identifying the rights and receiving of the response to identify the rights by the personal computer is carried out via the mobile communication terminal.

12. The mobile communication terminal of claim 5, wherein, if a request for running the software is received from a user, the personal computer transmits a request for identifying the rights to the authentication information management server, and the personal computer transmits the running signal to the mobile communication terminal according to the information on the rights generated by the authentication information management server.

13. The method of claim 1, further comprising determining whether the mobile communication terminal is connected to the personal computer prior to the transmitting of the authorization requests.

14. The storage medium of claim 6, the storage medium further comprising instructions for determining whether the mobile communication terminal is connected to the personal computer prior to the transmitting of the authorization requests.

* * * * *